United States Patent [19]
Clow, Jr. et al.

[11] 3,744,753
[45] July 10, 1973

[54] SEAT ADJUSTMENT FOR BUTTERFLY VALVE

[75] Inventors: Kent S. Clow, Jr., Lake Forest, Ill.; Carter C. Crookham, Oskaloosa, Iowa

[73] Assignee: Clow Corporation, Oak Brook, Ill.

[22] Filed: Aug. 11, 1971

[21] Appl. No.: 170,922

[52] U.S. Cl. .............................. 251/307, 277/187
[51] Int. Cl. .............................................. F16k 1/228
[58] Field of Search .................... 251/159, 170, 171, 251/362, 305, 306, 307, 308; 277/187

[56] References Cited
UNITED STATES PATENTS

| | | | |
|---|---|---|---|
| 3,630,485 | 12/1971 | Williams | 251/307 |
| 3,197,174 | 7/1965 | Killian | 251/307 |
| 3,393,697 | 7/1968 | Fawkes | 251/307 X |
| 3,412,675 | 11/1968 | Kurkjian | 251/307 X |

*Primary Examiner*—Henry T. Klinksiek
*Attorney*—Fitch, Even, Tabin & Luedeka

[57] ABSTRACT

A butterfly valve is disclosed which includes a valve disc and a ring defining a valve disc seat, the ring being capable of expanding radially to permit adjustment of the position of the seat. A plurality of segments are disposed adjacent the ring and chocks including at least two sets of opposed surfaces bear against the segments. The effective distance between the surfaces of each set of chocks is different so that the effective width of the chock varies depending upon which set of surfaces are in engagement with the segments and the valve body.

16 Claims, 9 Drawing Figures

PATENTED JUL 10 1973 3,744,753

INVENTORS
KENT S. CLOW JR.
CARTER C. CROOKHAM

Fitch, Even, Tabin, & Luedeka
ATTYS.

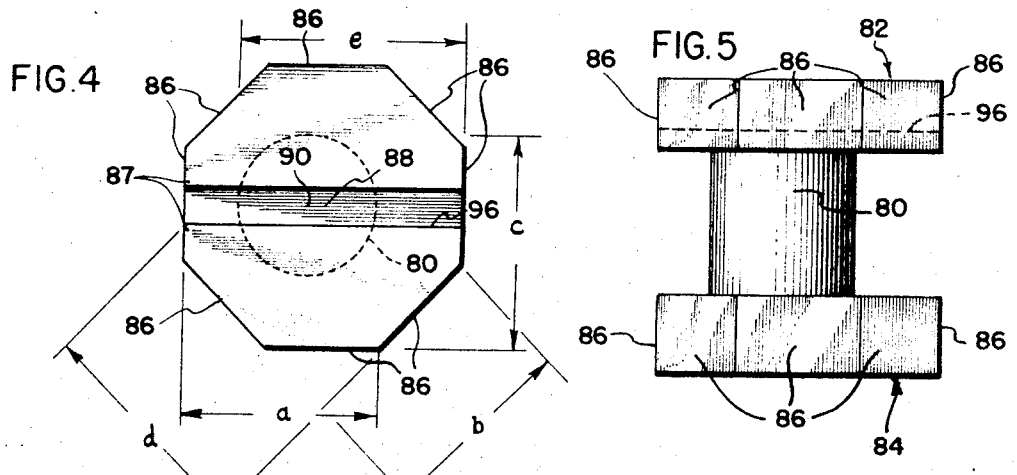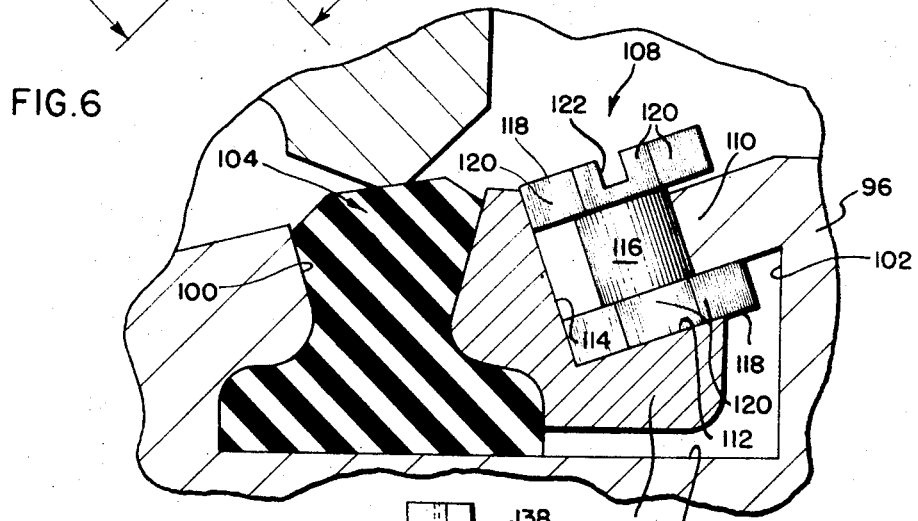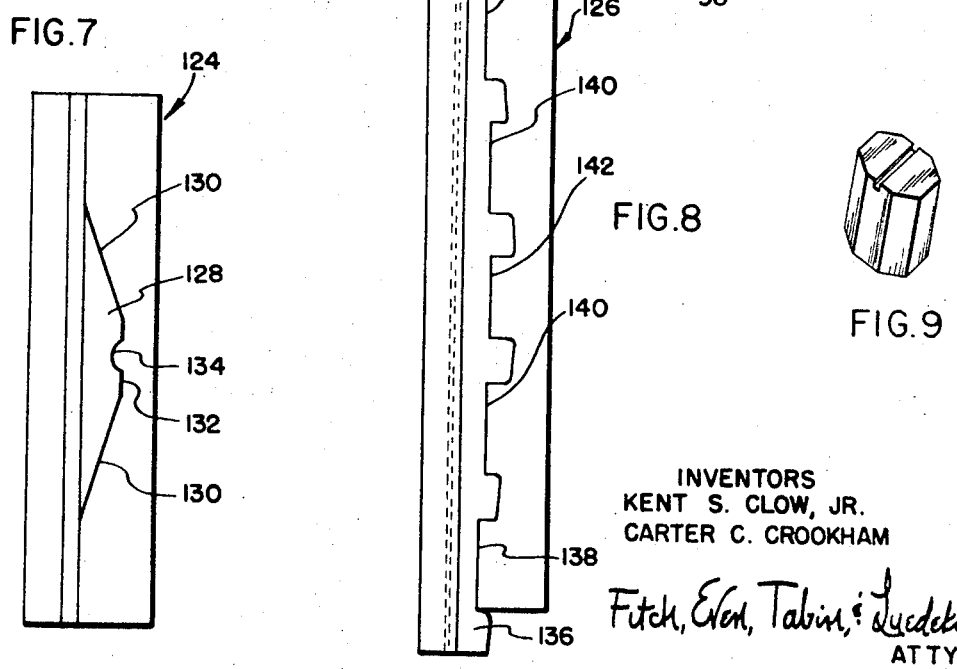

SEAT ADJUSTMENT FOR BUTTERFLY VALVE

The present invention relates to butterfly valves and, more particularly, to butterfly valves which include a resilient valve seat adapted to cooperate with the periphery of the valve disc to provide a seal.

Butterfly valves conventionally include a valve body defining a fluid flow passageway, and a circular or generally circular valve disc mounted within the valve body for pivotal movement between an open position parallel to the longitudinal axis of the flow passageway and a closed position perpendicular to the longitudinal axis of the flow passageway. When in the closed position, a peripheral portion of the disc engages a seat defined by the valve body to provide a fluid-tight seal. One of the interengaging sealing surfaces is preferably defined by a resilient material to assure a tight fit between these surfaces. In addition, the position of one of the surfaces is desirably rendered adjustable to eliminate the necessity of precise machining when the valve is fabricated and to permit compensation for wear and other factors adverse to a fluid-tight seal after the valve has been placed in service.

One approach for achieving the desired surface adjustment is to provide means for placing the resilient material defining one of the interengaging sealing surfaces in compression so as to expand the material and thereby shift the position of that sealing surface. The present invention relates to such a means particularly adapted to placing in compression and expanding a resilient material which defines that sealing surface which is supported by the valve body and engageable by the valve disc.

Accordingly, it is the principal object of the present invention to provide an improved butterfly valve of the type which includes a valve disc seat defined by a resilient material and means for placing the resilient material in compression so as to shift the position of the valve seat.

Other objects and advantages of the invention will become apparent with reference to the following description and the accompanying drawings.

In the drawings:

FIGS. 4 and 5 are plan and elevational views, respectively, of one element forming a portion of the butterfly valve shown in FIGS. 1 through 3;

FIG. 6 is an enlarged fragmentary sectional elevational view similar to that shown in FIG. 2, but illustrating an alternate embodiment of the invention; and FIGS. 7 and 8 are plan views of portions of the butterfly valve shown in FIG. 3, but illustrating alternate embodiments of those portions;

FIG. 9 is a perspective view of an element similar to that illustrated in FIGS. 4 and 5, particularly adapted for use with the retainer depicted in FIG. 8.

Figure 1:
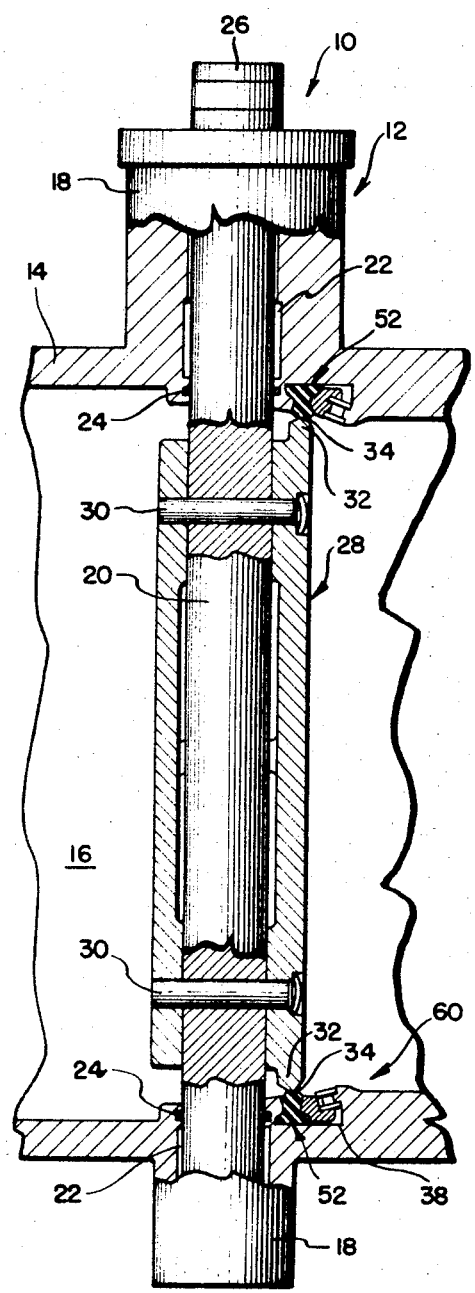
FIG. 1 is a fragmentary elevational view, partially in section, of a butterfly valve showing various of the features of the invention.

Referring more specifically to the drawings, there is illustrated in FIG. 1 a butterfly valve 10 which incorporates various of the features of the invention. The valve 10 includes a valve body 12, only a portion of which is illustrated. Basically, the valve body includes a generally cylindrical wall 14 defining a fluid flow passageway 16, the longitudinal axis of this passageway being hereinafter referred to as the flow axis of the passageway. Although not shown in the drawing, it is contemplated that an annular flange be provided at each end of the cylindrical wall 14 to facilitate attachment of the valve body to suitable segments of pipe or conduit.

Projecting from the valve body at diametrically opposed locations are a pair of trunions 18 which define suitable journals for a valve stem 20. Although all of the internal details of construction of the trunions are not shown, each journal is illustrated as being lined with a suitable bearing material indicated at 22, and each may be provided with a sealing element such as an O-ring 24 disposed in a suitable groove, as shown, or in the bearing space. One end 26 of the valve stem 20 projects outwardly of its trunion 18 for connection to a suitable operating device (not shown) by means of which rotation of the stem is effected.

A valve disc 28 is mounted on the valve stem and, as illustrated, is cylindrical and includes a diametrical bore to receive the valve stem 20. However, the disc may be provided with diametrically opposed flats under some circumstances at the points where the valve stem is joined to the disc. Suitable holes extend through the disc and stem to receive pins 30 by means of which the disc is secured to the stem, but the disc may also be keyed or otherwise held to the stem. The disc includes adjacent one face a radially projecting peripheral flange 32 machined to provide an edge 34 which is the only portion of the disc to engage the valve seat 36, soon to be described. The plane within which the edge 34 of the valve disc lies is offset from the axis of rotation of the disc, as defined by the longitudinal axis of the valve stem 20, to make possible 360° contact between the edge 34 and the valve seat 36.

Figure 2:
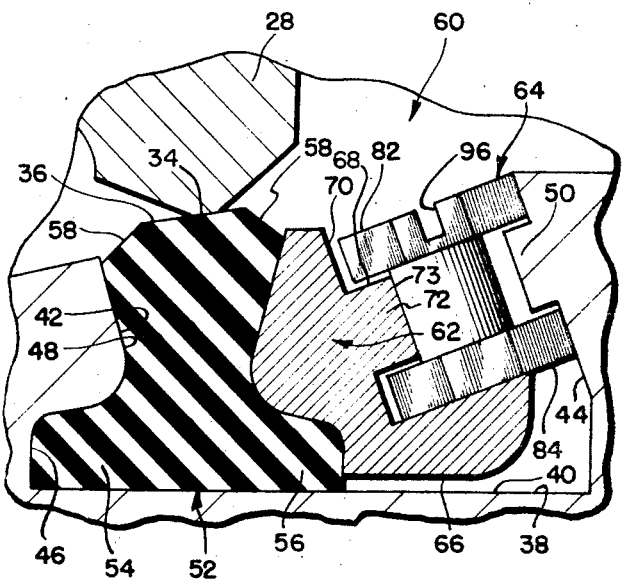
FIG. 2 is an enlarged fragmentary sectional elevational view of a portion of the butterfly valve shown in FIG. 1.

In order to accommodate the valve seat 36, the valve body 12 is provided with an inner annular groove 38 in the surface of the cylindrical wall 14 which defines the fluid flow passageway 16. The groove is positioned so as to be intersected by the plane defined by the valve disc edge 34 when the disc is in the closed position transverse to the fluid flow passageway, and the groove 38 includes a base 40 and opposed side walls 42 and 44. The base 40 may define a generally cylindrical surface, and is so illustrated, while the side walls 42 and 44 are contoured (FIG. 2). More specifically, the groove wall 42 nearest the valve stem 20, hereinafter sometimes referred to as the left wall because of its location in the drawing, is undercut to provide a slot 46 relative to which an upper portion 48 is disposed in overhanging relation. The face of the upper portion 48 is slightly inclined relative to the flow axis of the passageway 16. The opposite or right wall 44 of the groove is also inclined relative to the flow axis of the passageway and may be roughly parallel to the inclined face of the upper portion 48 of the opposite groove wall 42. The groove wall 44 is provided with a projection 50, the function of which will become apparent shortly.

The valve seat 36 is defined by the radially inner surface of a ring 52 formed of a resilient elastomeric material such as rubber which will expand under compression if otherwise unrestrained. Various materials known in the art for this particular application are suitable. The ring 52 may be formed of one piece or two or more pieces, which pieces may or may not be connected or bonded to one another at their adjacent ends. It is formed to provide a pair of axially extending flanges 54 and 56 adjacent its outer periphery (FIG. 2), and extends radially from these flanges a distance greater than the depth of the groove 38 so that the seat 36, defined by the inner surface of the ring 52, is disposed inwardly of the inner surface of the valve body walls defining the fluid flow passageway 16. As shown, the ring is of a lesser axial width than the groove 38, i.e., the axial width of the ring at its outer surface defined by the flanges 54 and 56 is less than the axial width of the base 40 of the groove. However, the flanges 54 and 56 could extend from the wall 44 to the wall 46 of the groove if desired. The seat 36 itself may define a cylindrical surface but, as shown, is inclined slightly relative to the flow axis and therefore defines a conical surface to enhance the sealing ability of the valve. The leading and trailing edges of the ring are chamfered adjacent the seat 36, as at 58.

As disposed in the groove 38, the outer surface of the ring 52 rests on the base 40 of the groove, with the flange 54 of the ring disposed within the slot 46 of the groove wall 42, thereby serving to partially lock the ring within the groove. Preferably, the groove wall 42 and the adjacent surface of the ring 52 are so shaped as to permit intimate engagement between the wall and ring and, in the illustrated embodiment, the edges of each are rounded to eliminate stress concentrations. Because of the difference between the axial width of the ring and the axial width of the groove, an annular space is provided between the opposite surface of the ring (i.e., the surface on the right in FIGS. 1 and 2) and the wall 44 of the groove.

With the ring supported on the base 40 of the groove with one face thereof in abutting intimate engagement with the wall 48 of the groove, compressive forces applied to the opposite face of the ring, particularly those having an axial component, will cause radial inward expansion of the ring effective to vary the position of the sealing surface 36. Such compressive forces are applied to the ring by axially adjustable means 60, hereinafter described.

The adjustable means 60 include a plurality of arcuate segments 62 adapted to be disposed as a segmental annular retainer in the annular space between the valve seat ring 52 and the wall 44 of the groove 38 and to be urged into pressure engagement with the valve seat ring 52. A plurality of chocks 64 are also provided and are adapted to maintain the segments in such pressure engagement.

More specifically, each segment 62 is in the form of an elongated bar bowed slightly to render it arcuate when properly disposed in the groove 38 and viewed in a plane normal to the flow axis of the passageway 16. The segments are preferably relatively short in length. For example, with segments approximately 4 inches in length, 12 segments are provided for a valve having a flow passageway diameter of sixteen inches. Each segment has one axially directed surface contoured so as to enable it to intimately engage the adjacent face, i.e., the right hand face, of the valve seat ring 52. Each segment is dimensioned so that when it is in intimate engagement with the ring, its lower surface 66 is elevated slightly above the base 40 of the groove 38. Thus, the segments 62 are readily movable axially within the annular space defined by the ring 52 and the groove wall 44.

Figure 3:
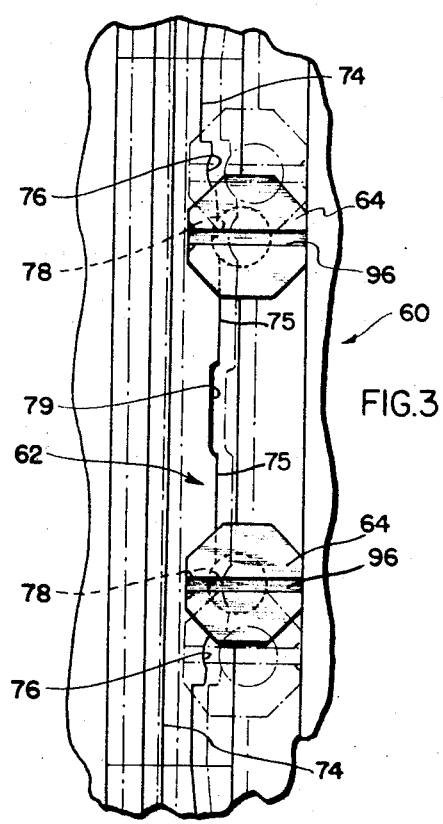
FIG. 3 is an enlarged fragmentary plan view of that portion of the butterfly valve of FIG. 1 which is shown in FIG. 2.

The remaining face of each of the segments 62, i.e., the face not in contact with the valve seat ring 52 (FIG. 2), is provided with a ledge 68 which slopes downwardly and to the left and a wall 70 which is inclined upwardly and to the left. A rib 72 projects outwardly from the wall 70 and extends the length of the segment, the upper surface of which (as viewed in FIG. 2.) constitutes the ledge 68. Portions of the rib define a bearing surface 73, as will become apparent shortly. The rib portion of each segment 62 includes a step 74 adjacent each end and a portion 75 which slopes inwardly from each step toward the center of the segment as shown in FIG. 3. Thus, as can be seen in FIG. 3, the bearing surface 73 of the rib 72 and the wall 44 of the groove are in converging relation from the end of the step 74 at each end of the segment throughout the length of the sloping portions 75. This step arrangement facilitates insertion of the chocks 64 intermediate the segments 62 and the wall 44, as will become apparent shortly.

In the embodiment illustrated in FIG. 3, the rib 72 is provided with a set of notches 76 in each of the sloping portions 75 thereof, and with at least one additional set of notches 78 located inwardly of the notches 76 but also in the sloping portions. In addition, the rib is provided with an elongated, generally rectangular indentation 79 at approximately its longitudinal midpoint. The notches 76 and 78 are of equal depth but, by virtue of the fact that they are located on inclined or sloping surfaces 75, the base or innermost portions of the notches 76 are located a greater distance from the adjacent wall 44 of the groove 38 than are the base or innermost portions of the notches 78 (FIG. 3). Thus, if a pair of chocks of equal effective diameter are placed respectively in the notches 76 of a segment 62 and bear against the wall 44, e.g., as shown in phantom in FIG. 3, the segment 62 will be displaced a lesser distance axially (to the left in FIGS. 1–3) than if the chocks are placed in the notches 78, as shown in full lines in FIG. 3.

The chocks 64 are adapted to be placed intermediate the segments 62 and the adjacent wall 44 of the groove 38. They are proportioned so that they will bear against each the segment and groove wall so as to maintain the segments a desired distance from the wall 44 and to maintain the segments in a pressure engagement with the valve seat ring 52 which will effect radial expansion thereof. Thus, the chocks cause the segments to always exert a compressive force on the valve seat ring 52. The degree of force will vary depending upon which set of notches 76 or 78 the chocks occupy. In addition, the chocks are formed eccentrically about their longitudinal axes so as to permit their effective diameter to be varied depending upon their rotative position, thus permitting further adjustment in the compressive forces which they maintain.

More specifically, a representative chock 64 is illustrated in enlarged form in FIGS. 4 and 5 and includes a generally cylindrical hub 80 provided with a head 82 and 84 of polygonal transverse cross-sectional configuration at each end respectively. The hub 80 is of circular transverse cross-sectional configuration (FIG. 4), although other configurations are possible, and has a radius closely corresponding to the radius of curvature of the notches 76 and 78 so that the hub will conveniently fit into and bear against the bases of the notches. In a preferred embodiment, the hub has a radius of approximately one-eighth inch and the notches have a radius of curvature which is slightly larger.

By virtue of their polygonal cross-sectional configuration, the heads 82 and 84 define flats 86 which lie in planes parallel to the cylindrical axis of the hub 80. In the illustrated embodiment, the polygonal configuration is octagonal, although other configurations are possible. Both heads 82 and 84 are of like configuration and size so that each flat of each head lies in the same plane as a flat of the opposite head. In the assembled valve of the embodiment of FIGS. 1–3, the hub of each chock bears against the bearing surface 43 of the rib 72 of a segment 62 while a flat of each head 82 and 84 bears against the groove wall 44. Thus, the effective width of the chock for purposes of spacing the segment 62 from the wall 44 is the distance between the plane within which lie the flats 86 in engagement with the groove wall 44, and the diametrically opposite surface of the hub 80.

As best seen in FIG. 4, the geometric centers 88 of the heads are displaced from the cylindrical axis 90 of the hub 80 along an axis perpendicular to one of the flats 86. Thus, the planes defined by certain pairs of flats 86 are spaced from the diametrically opposite cylindrical surface of the hub 80 a different distance than are other planes. In the illustrated embodiment, these different distances are designated $a$ through $e$, and it will be noted that there are thus five different spacings available. If the geometric centers of the heads are spaced from the cylindrical axis of the hub along a line not perpendicular to a flat 86 of an octagonal head, and along a line not passing through a corner, i.e., the line formed at the juncture of two flats 86, there will be seven different spacings. In the illustrated embodiment, one of the heads 82 is provided with a slot 96 in its outer surface transverse to the cylindrical axis 90 of the hub to receive the end of a screwdriver so as to facilitate rotation of the chock.

In the assembly of the embodiment of the butterfly valve 10, illustrated in FIGS. 1–5, assuming all initial machining has been accomplished, the valve seat 52 is inserted into the groove 38 in abutting relation to the wall 42 of the groove, and a segment 62 is then placed in the groove. At this stage of assembly, a gap will exist intermediate the segment 62 and the opposite wall 44 of the groove, and the ring 52 will not be in axial compression. A suitable tool such as a screwdriver is then inserted between the groove wall 44 and the segment in the vicinity of the indentations 79 to wedge the segment toward the valve seat ring 52, thereby enlarging the gap between the segment and the wall 44 and placing the ring 52 in compression.

A pair of chocks 64 is then inserted between the segment and the adjacent groove wall 44 to maintain the compression when the tool is removed. The chocks are preferably disposed as in FIG. 2, with the hubs 80 residing in and bearing against the base surfaces of notches 76, with a portion of each of the heads 82 and 84 disposed on opposite sides of the rib 72 of the segment, and with a flat 86 of each head bearing against the wall 44 above and below the projection 50. The rib 72 and projection 50, as disposed between the heads 82 and 84, thus maintain the chock against movement longitudinally of its axis. Other segments and chocks are then added until the required number of segments occupy the groove 38.

When the chocks are positioned with the hubs 80 resting in and partially confined by the semicircular notches, they can be rotated about the cylindrical axis of the hubs by means of a screwdriver inserted into the slots 96, these axes being stationary relative to the segments 62. Such rotation will bring different flats 86 of the chocks to bear against the groove wall 44 and thus further vary the compressive force which the chocks are capable of maintaining against the segments.

The proper or desirable degree of compression of the valve seat ring 52 is determined emperically by connecting the valve inlet to a source of fluid under pressure with the valve disc 28 in the closed position and then checking the outlet side of the valve disc for leakage. Accordingly, when placing the chocks 64 in the space between the segments and groove wall 44, it is preferable to first place a chock in each of the notches 76 and with the flat 86 the minimum distance $a$ from the surface of the hub in contact with the wall 44. This flat is marked with notches 87 to distinguish it from the remaining flats. If such an arrangement produces leakage at certain portions of the periphery of the valve disc, the chocks adjacent such portions are rotated to successively bring the flats which are a distance $b$, $c$, $d$, and $e$ from the opposed surface of the hub into contact with the wall 44, thereby moving or camming the segment axially in the direction of the valve seat ring 52 and compressing same so as to move the sealing surface 36 radially inwardly. If further compression is necessary, the chocks are rotated until the flat a distance $a$ from the opposite surface of the hub 80 is again brought into contact with the wall 44, and the chocks are moved to the notches 78 and rotation begun again until the resulting compression produces the necessary radial expansion of the valve seat ring.

In a preferred embodiment, movement of a chock from a notch 76 to a notch 78 maintains a difference in axial displacement of 0.04 inch if the same flat of the chock is in engagement with the groove wall 44. In addition, rotation of the chock illustrated in FIG. 4 will produce a total axial displacement of approximately 0.044 inch in four increments.

While a specific embodiment of the invention has been shown and described, a number of variations thereof are possible. For example, the notches 76 and 78 can be provided in a second series of segments or wedges disposed adjacent the groove wall 44, the chocks being thereby interposed between two segments. Likewise, while the notches 76 and 78 conveniently locate the chocks to assure that pressure will be applied uniformly to the valve seat ring 52, such notches could in some instances be dispensed with or could be other than a curved configuration to coact with a hub having other than a cylindrical surface. Also, additional sets of notches, such as the notches 76 and 78, could be provided. In some circumstances, the chocks could be of uniform cross-sectional configuration from one end to the other so as not to include a hub, with the spacing between opposed sets of faces being varied to provide the desired variation incident to rotation. If a sufficient number of notches were provided, the added adjustment achieved by rotation of the chocks may not be required. Finally, and with reference to FIG. 2, the head 84 of the chock 64 could be of circular rather than polygonal configuration and serve merely as a retainer, with the head 82 bearing the load.

In the embodiment thus described, the hubs 80 of the chocks bear against the bearing surface 73 of the rib 72 of the segments, and the flats 86 bear against the groove wall 44. This arrangement is believed preferable since the resulting force as applied to the segments has a greater vertical component, thus reducing the tendency of the valve seat ring to lift out of the groove 38 incident to its radial expansion. However, the arrangement of elements could also be such as is shown in FIG. 6, in which a valve body 96 is provided with a groove 98 having opposed walls 100 and 102 to receive a valve seat ring 104, segments 106 and chocks 108. The groove wall 100 is identical in contour to the groove wall 48 in the embodiment previously described. However, the groove wall 102 is generally radially disposed except for a projection 110 which extends in the direction of the wall 100 and which is inclined slightly toward the base of the groove. The segments 106 do not include a rib 72, as do the segments 62, but are merely provided on their side opposite the valve seat ring 104 with a cutout defining a sloping bottom wall 112 and an inclined side wall 114.

In the embodiment of FIG. 6, the chocks 108 are identical to the chocks 64 and include a hub 116 and a pair of heads 118 having flats 120 and a slot 122. The chocks are arranged with their hubs 116 bearing against the face of the projection 110 of the groove wall 102 and with a flat 120 of each head 118 bearing against the inclined side wall 114 of the segment. Neither the projection 110 nor the segments 106 is provided with notches in the embodiment of FIG. 6, although notches could be provided if desired.

FIGS. 7 and 8 illustrate two different forms of segments 124 and 126 intended to be used in the manner illustrated in FIG. 3. In the embodiment of FIG. 7, the segment 124 is similar to the segment 62 with the exception that it includes a rib 128 which, unlike the rib 72 of the segment 62, does not extend the full length of the segment. Rather, it is centrally located and has a length somewhat over one half the length of the segment. The rib 128 is provided with surfaces 130 which slope sharply away from a central plateau 132 provided with a singular notch 134. The segment 124 is utilized in generally the same manner as the segment 62, except that a single chock is employed to maintain the segment in compressive contact with the valve seat ring, and there is only one notch rather than two or more. Thus, adjustment is provided solely by rotation of the eccentric chock.

Segment 126 illustrated in FIG. 8 includes a rib 136 defining two sets of relatively wide rectangular notches 138 and 140 as well as a centrally located indentation 142. The notches 138 and 140 have a flat base, but the notches 138 are deeper than the notches 140 by approximately 0.04 inch to provide a degree of adjustment depending upon which set of notches the chocks 144 occupy. By virtue of the wide rectangular configuration of the notches 138 and 140, they are particularly adapted for use with chocks having a uniform polygonal cross-sectional configuration from one end to the other and providing sets of opposed flats with the flats of each set being spaced from each other a distance different from that between opposed flats of the remaining sets. This could be accomplished, for example, through the use of rectangular stock of other than square cross-sectional configuration.

While certain specific embodiments of the invention have been shown and described, it should be apparent that various modifications might be made therein without departing from the scope of the invention.

Various of the features of the invention are set forth in the following claims.

WHAT IS CLAIMED IS:

1. A butterfly valve comprising a valve body having a fluid flow passageway provided with an inner annular groove defined by a base encircling said passageway and first and second opposed groove walls, a ring defining a valve disc seat disposed in said annular groove and projecting radially into said fluid flow passageway, one surface of said ring being in engagement with said first groove wall, said ring being formed of a resilient material capable of expanding radially when subjected to compressive forces having components extending in other directions, said ring being proportioned so as to provide an annular space intermediate a portion of said ring and said second opposed groove wall, and adjustment means disposed within said annular space for applying forces to said ring to effect said radial expansion thereof, which adjustment means includes annular retainer means disposed in said annular space for axial shifting movement and a plurality of chocks interposed between said retainer means and said second groove wall maintaining said retainer means in pressure engagement with said ring, each of said chocks including at least two sets of opposed surfaces, one of the surfaces of each set engaging said retainer means and the other surface of each set engaging said second groove wall, the effective distance between the opposed surfaces of one set being less than the effective distance between the opposed surfaces of the other set so that the effective width of said chock varies depending upon which set of opposed surfaces are in such engagement.

2. A butterfly valve in accordance with claim 1 wherein said chocks are rotatable while interposed in said annular space to bring one or the other of said sets of surfaces into operative engagement with said retainer means and with said second groove wall.

3. A butterfly valve in accordance with claim 2 wherein said means are provided on said chocks to facilitate rotation thereof.

4. A butterfly valve in accordance with claim 2 wherein said chocks are rotatable about axes transverse to the axis of said fluid flow passageway.

5. A butterfly valve in accordance with claim 1, wherein one of said retainer means and said second groove wall is provided with radially extending notches to retain said chocks in a desired location.

6. A butterfly valve in accordance with claim 1, wherein one of said opposed chock surfaces of each of said sets is curved about an axis extending generally radially of said valve.

7. A butterfly valve in accordance with claim 6, wherein said curved surface is cylindrical.

8. A butterfly valve in accordance with claim 1, wherein each of said chocks has a polygonal head at each end of a generally cylindrical central portion with each head having flat faces lying in common planes parallel to the cylindrical axis of said central portion, the geometric center of each head being displaced from the cylindrical axis of said central portion, whereby segments of the outer surface of said central portion define one of said opposed surfaces of each set and said flat faces define the other of said opposed surfaces.

9. A butterfly valve in accordance with claim 8, wherein said heads are wider than the diameter of said central portion, and wherein one of said retainer means and said second groove wall includes projecting means which protrudes into the space between said heads to restrain said heads against radial movement.

10. A butterfly valve in accordance with claim 9 wherein said retainer means overlies a flange portion of said resilient ring and said chock engages said retainer means at a surface which slopes upward toward said valve disc seat.

11. A butterfly valve in accordance with claim 9 wherein both said retainer means and said second groove wall include said projecting means.

12. A butterfly valve in accordance with claim 1 wherein said annular retainer means is made up of a plurality of segments and wherein at least one said chock is associated with each segment.

13. A butterfly valve in accordance with claim 12, wherein at least two notches are provided in the surface of each segment contacting said chocks, and wherein each notch is dimensioned and located a different distance from the surface engaging said ring so as to enable a given chock to cause said segment to maintain said ring in a different degree of compression depending upon which notch said chock occupies.

14. A butterfly valve in accordance with claim 12, wherein at least two pairs of spaced notches are provided in each segment, and wherein the notches of each pair are equally dimensioned and located so as to cause said segment to apply a uniform degree of pressure when occupied by two comparable chocks.

15. A butterfly valve in accordance with claim 1, wherein said retainer means and said second groove wall define a plurality of converging surface portions engageable by said chocks and spaced circumferentially about said annular space, and wherein each of said surface portions is provided with at least two notches to receive said chocks, each of said notches being positioned and dimensioned so as to enable a given chock to cause said segment to maintain said ring in a different degree of compression depending upon which notch said chock occupies.

16. A butterfly valve comprising a valve body having a fluid flow passageway provided with an inner annular groove defined by a base encircling said passageway and first and second opposed groove walls, a ring defining a valve disc seat disposed in said annular groove and projecting radially into said fluid flow passageway with one surface of said ring in engagement with said first groove wall, said ring being formed of a resilient material capable of expanding radially when subjected to compressive forces having components extending in other directions, said ring being proportioned so as to provide an annular space intermediate a portion of said ring and said second opposed groove wall, and adjustment means disposed within said annular space for appyling forces to said ring to effect said radial expansion thereof, which adjustment means includes annular retainer means disposed in said annular space for axial shifting movement and a plurality of chocks interposed between said retainer means and said second groove wall for maintaining said retainer means in pressure engagement with said ring, each of said chocks including a polygonal head at each end of a generally cylindrical central portion, said heads being wider than the diameter of said central portion and having flat faces lying in common planes parallel to the cylindrical axis of said central portion, the geometric center of each head being displaced from the axis of said cylindrical central portion, said cylindrical surface of said central portion and a pair of said flat faces engaging said retainer means and said second groove wall, one of said retainer means and said second groove wall including projecting means which protrudes into the space between said heads to restrain said heads against radial movement.

* * * * *